(12) United States Patent
Wu et al.

(10) Patent No.: US 9,453,956 B2
(45) Date of Patent: Sep. 27, 2016

(54) THIN TYPE DISPLAY MODULE

(71) Applicant: AU Optronics Corporation, Hsin-Chu (TW)

(72) Inventors: Chia-Hao Wu, Hsin-Chu (TW); Han-Ping Kuo, Hsin-Chu (TW); Yu-Chan Hsieh, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 189 days.

(21) Appl. No.: 14/267,024

(22) Filed: May 1, 2014

(65) Prior Publication Data

US 2015/0055372 A1     Feb. 26, 2015

(30) Foreign Application Priority Data

Aug. 20, 2013  (TW) .............................. 102129857 A (51) Int. Cl.
*F21V 8/00* (2006.01)

(52) U.S. Cl.
CPC ............. *G02B 6/002* (2013.01); *G02B 6/0018* (2013.01); *G02B 6/0046* (2013.01)

(58) Field of Classification Search
CPC  G02B 6/0046; G02B 6/0055; G02B 6/0083; G02B 6/0018; G02B 6/002
See application file for complete search history.

(56) References Cited

U.S. PATENT DOCUMENTS

| 5,914,760 | A  | * | 6/1999  | Daiku ..................... G02B 3/005 349/62 |
| 8,049,839 | B2 |   | 11/2011 | Han et al. |
| 8,134,658 | B2 | * | 3/2012  | Shiraishi .............. G02B 6/0055 349/65 |
| 8,814,412 | B2 | * | 8/2014  | Yabe ....................... G02B 6/002 362/606 |
| 2008/0043171 | A1 | * | 2/2008  | Takahashi ............ G02B 6/0083 349/65 |
| 2008/0159693 | A1 |   | 7/2008  | Chang |
| 2010/0195019 | A1 |   | 8/2010  | Shinohara et al. |
| 2012/0002441 | A1 |   | 1/2012  | Yabe et al. |
| 2012/0294034 | A1 |   | 11/2012 | Kim et al. |

FOREIGN PATENT DOCUMENTS

| CN | 201029017 | Y | 2/2008 |
| CN | 102105737 | A | 6/2011 |
| CN | 102789091 | A | 11/2012 |
| TW | 200827852 |   | 7/2008 |
| TW | 200907251 |   | 2/2009 |

OTHER PUBLICATIONS

English translation of abstract of TW 200827852 (published Jul. 1, 2008).
Office Action issued in corresponding China patent application on Dec. 1, 2015.

* cited by examiner

*Primary Examiner* — Stephen F Husar
*Assistant Examiner* — Danielle Allen
(74) *Attorney, Agent, or Firm* — McClure, Qualey & Rodack, LLP (57) ABSTRACT

A display module including a backlight module and a display panel is provided. The backlight module includes a light guide plate and a light source module. The light guide plate has a light incident surface, a light-exiting surface, a light-guiding inclined surface, a bottom surface, and a lateral surface, wherein the light-guiding inclined surface is connected to the light incident surface and the light-exiting surface; the light incident surface, the light-guiding inclined surface, and a portion of the bottom surface constitute a wedge portion while the light-exiting surface, the lateral surface, and other portions of the bottom surface constitute a plate portion. The light source module is disposed at the light incident surface and emits light into the wedge portion. The display panel is disposed on the light guide plate and has a side. The side of the display panel has a projection disposed in the light-guiding inclined surface or the plate portion.

14 Claims, 7 Drawing Sheets

THIN TYPE DISPLAY MODULE

BACKGROUND OF THE DISCLOSURE

1. Field of the Disclosure

The present disclosure generally relates to a display module. Particularly, the present disclosure relates to a thin type display device.

2. Background

The liquid crystal display device is extensively used in a variety of electrical products such as computers, televisions, communication devices. The liquid crystal display panel is provided with light by the backlight module. The backlight module includes the light guide plate, which has the ability of guiding the direction of the light, improving luminance of the backlight module and controlling brightness uniformity. On the other hand, the display devices tend to be thinner and lighter along with improvement of industry technology and living demands. Accordingly, the inside components of the display device or the electrical devices having displaying function have to exhibit equal or even better functions along with improvement of the appearance even if the volume thereof and the space therein are limited.

SUMMARY

In accordance with aspects of the present disclosure to provide a display device having smaller thickness.

In accordance with another aspect of the present disclosure to provide a backlight module providing sufficient brightness for the thin type display modules.

In accordance with one embodiment of the present disclosure, a display module is disclosed. The display module includes a backlight module and a display panel. The backlight module includes a light guide plate and a light source module. The light guide plate has a light incident surface, a light-exiting surface, a light-guiding inclined surface, a bottom surface, and a lateral surface, wherein the light-guiding inclined surface is connected to the light incident surface and the light-exiting surface; the light incident surface, the light-guiding inclined surface, and a portion of the bottom surface constitute a wedge portion while the light-exiting surface, the lateral surface, and other portions of the bottom surface constitute a plate portion. The light source module is disposed at the light incident surface and emits light into the wedge portion. The display panel is disposed on the light guide plate and has a side. The side of the display panel has a projection disposed in (or namely falling on) the light-guiding inclined surface or the plate portion.

DETAILED DESCRIPTION

Figure 1:
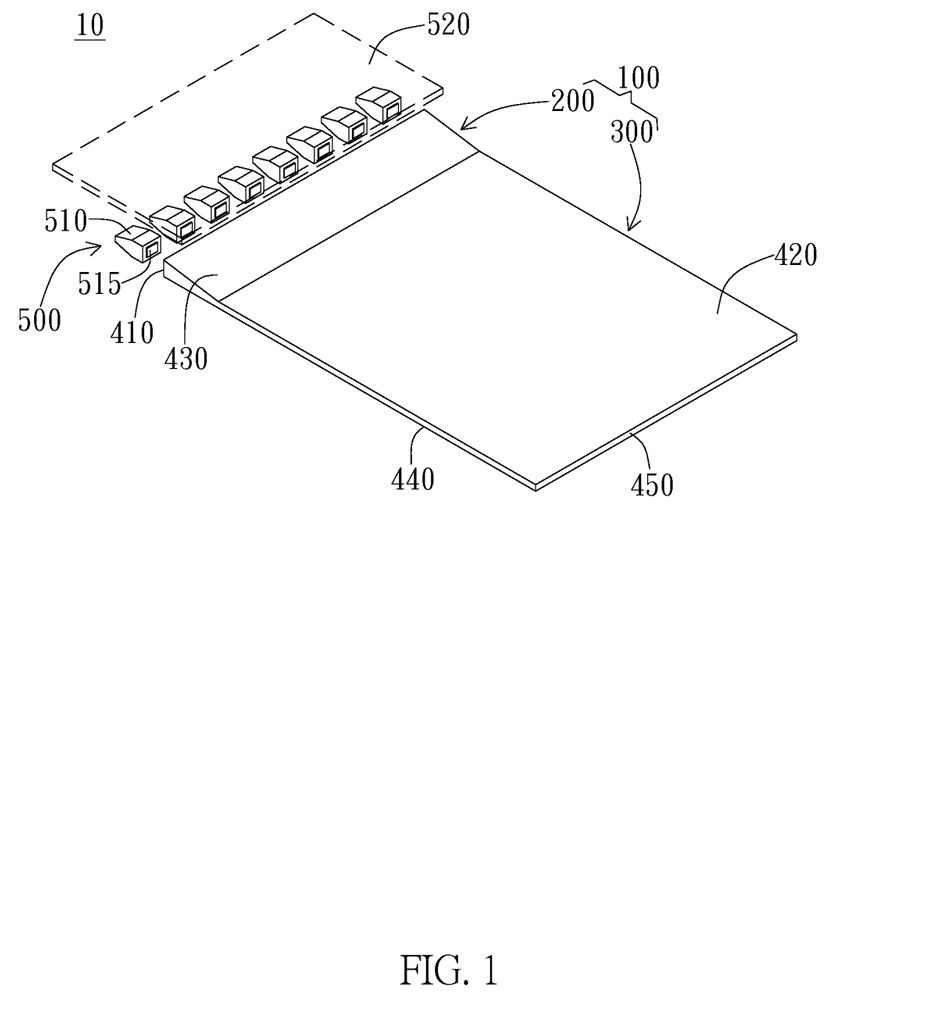
FIG. 1 is a three-dimensional view of the embodiment of the backlight module of the present disclosure.

As shown in FIG. 1, the backlight module of the present disclosure includes a light guide plate 100 and a light source module 500. The light guide plate may be provided by the methods including injection molding and Multi-Scale Imprinting (MSI) and generally has a rectangular outline, but not limited thereto, for example, polygon shaped or other suitable methods. The light guide plate 100 has a light-entering surface (or namely light incident surface) 410 and a light-exiting surface 420. The light source module 500 is disposed on one side of the light-entering surface 410 of the light guide plate 100 and may include a plurality of light sources 510 and usually further includes a circuit board 520.

The light emitted from the light source module 500 enters the light guide plate 100 through the light-entering surface 410; the light afterwards exits from the light-exiting surface 420 of the light guide plate 100 so that an area (surface) light source is provided for an display panel. The light source module 500 is preferably disposed on one side of the light guide plate 100 that has the light-entering surface 410, so that an illumination side 515 of the light source 510 faces the light-entering surface 410. In addition to the light-exiting surface 420, the light guide plate 100 further has a bottom surface 440 and a lateral surface 450, wherein the light-exiting surface 420 and the bottom surface 440 are two opposite surfaces of the light guide plate 100, i.e. the upper surface (light-exiting surface 420) and the lower surface (bottom surface 440) of the light guide plate 100, respectively. The lateral surface 450 is connected to the light-exiting surface 420 and the bottom surface 440. The light guide plate 100 further has a light-guiding inclined plane (or namely light-guiding inclined surface, or namely light-guiding slanted surface, or namely light-guiding oblique surface) 430 on the same side with the light-exiting surface 420. As the embodiment shown in FIG. 1, the light-guiding inclined plane 430 is connected to the light-entering surface 410 and the light-exiting surface 420, wherein the end of the light-guiding inclined plane 430 connected to the light-entering surface 410 is farther from the bottom surface 440 than the other end of the light-guiding inclined plane 430 connected to the light-exiting surface 420. In other words, the light-guiding inclined plane 430 inclines to the bottom surface 440 in a direction while leaves away from the light-entering surface 410. In addition, as shown in FIG. 1, the end of the light-guiding inclined plane (light-guiding inclined surface) 430 connected to the light-entering surface (light incident surface) 410 is substantially parallel to the end of the light-guiding inclined plane connected to the light-exiting surface 420.

Preferably, the embodiment of the light guide plate of the present disclosure includes a wedge portion 200 and a plate portion (or namely body portion) 300, wherein the wedge portion 200 is located on the side of the light guide plate 100 having the light-entering surface 410 and contains the light-entering surface 410, the light-guiding inclined plane 430 and a portion of the bottom surface 440. The plate portion 300 is adjacent to the wedge portion 200 and contains the light-exiting surface 420, a large portion of the lateral surface 450 and the bottom surface 440. Specifically, as a cross-sectional view or a side view of FIG. 1 shows, the wedge portion 200 is mainly constituted by the light-guiding inclined plane 430, a portion of the bottom surface 440, and the light-entering surface 410 that is connected to the light-guiding inclined plane 430 and the bottom surface 440. The plate portion 300 is mainly constituted by the light-exiting surface 420, another portion of the bottom surface 440, and at least one of the lateral surface 450, wherein the lateral surface 450 is connected to the light-exiting surface 420 and the another portion of the bottom surface 440. Preferably, the wedge portion 200 and the plate portion 300 are made in an integral form to form the light guide plate 100. Generally speaking, the plate portion 300 is the portion of the light guide plate of the present disclosure responsible for light exiting. A length of the wedge portion 200 and a degree to which the light-guiding inclined plane 430 inclines affect light transmission in the plate portion 300 and light exiting therefrom. The light exiting, for example, is related to the brightness of the display panel. In other variant embodiments of the present disclosure, microstructures (not shown) may be formed on the light-guiding inclined plane 430. For example, the microstructures (not shown) may decrease the light loss due to the light exiting from the light-guiding inclined plane 430. That is, the light from the light source module 500 may be guided to the plate portion 300 of the light guide plate 100 by the microstructures (not shown) and exits from the light-exiting surface 420 of the light guide plate 100. In other embodiments, the light-guiding inclined plane 430 may have reflecting or refracting components disposed thereon to accomplish the above effects, i.e. the effects of the microstructures. In addition, the lateral surface 450 and/or the bottom surface 440 of the light guide plate 100 may have at least one of such as microstructures (not shown), a reflective component, a refractive component and other applicable components disposed thereon for the light exiting from the light-exiting surface 420 of the light guide plate 100.

On the other hand, the plate portion 300 of the light guide plate 100 of the present disclosure preferably has a smaller thickness; for example, the light guide plate has a thickness substantially smaller or substantially equal to 0.28 mm, but not limited thereto. A height of the light-entering surface 410 on the wedge portion 200 preferably corresponds to an illumination side 515 of the light source module (please refer to FIG. 4). Preferably, a projection of the illumination side 515 on a plane where the light-entering surface 410 lies is preferably within the light-entering surface 410 to ensure that the light is sufficiently used. In the embodiment of the present disclosure, a thickness of the side of the wedge portion 200 adjacent to the plate portion 300 is substantially equal to a thickness of the plate portion 300. A thickness of the side of the wedge portion 200 having of the light-entering surface 410 is substantially greater than the thickness of the plate portion 300 and is such as about 0.4 mm or 0.6 mm, but not limited thereto.

Figure 2A:
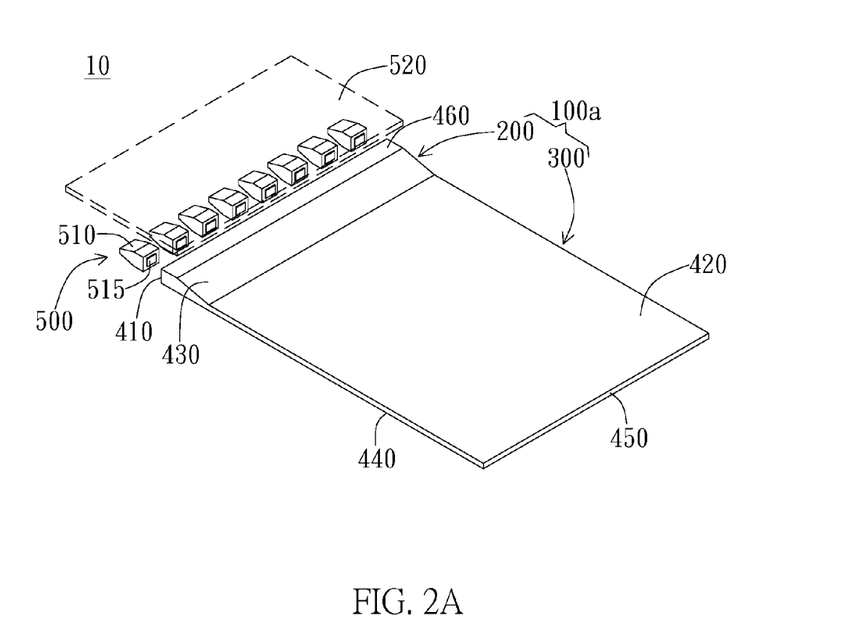
FIG. 2A is a three-dimensional view of another embodiment of the backlight module of the present disclosure.

As the embodiment shown in FIG. 2A, the light-guiding inclined plate 430 of a light guide plate 100a may have one end connected to the light-exiting surface 420 and the other end connected to a top surface 460 of the light guide plate 100a. That is, the light-guiding inclined plane 430 is between the top surface 460 and the light-exiting surface 420; the top surface 460 and the light-exiting surface 420 is separated from each other, and the top surface 460 is connected to the light-exiting surface 420 via the light-guiding inclined plane 430. Preferably, an area of a vertical projection of the top surface 460 (e.g. falling on the bottom surface 440) is substantially smaller than an area of a vertical projection of the light-guiding inclined plane 430. In this case, as a side view or a cross-sectional view of FIG. 2A shows, the wedge portion 200 is mainly constituted by the top surface 460, the light-entering surface 410, the light-guiding inclined plane 430 and a portion of the bottom surface 440, wherein the top surface 460 is connected to the light-entering surface 410 and the light-guiding inclined plane 430; the light-entering surface 410 is connected to the top surface 460 and the portion of the bottom surface 440. The plate portion 300 is mainly constituted by the lateral surface 450, the light-exiting surface 420, and another portion of the bottom surface 440, wherein the lateral surface 450 is connected to the light-exiting surface 420 and the another portion of the bottom surface 440. In addition, a vertical distance between the top surface 460 and the bottom surface 440 in the normal direction is substantially equal to the greatest thickness of the light guide plate 100a such as the thickness "h4" shown in FIG. 2B.

Figure 2B:
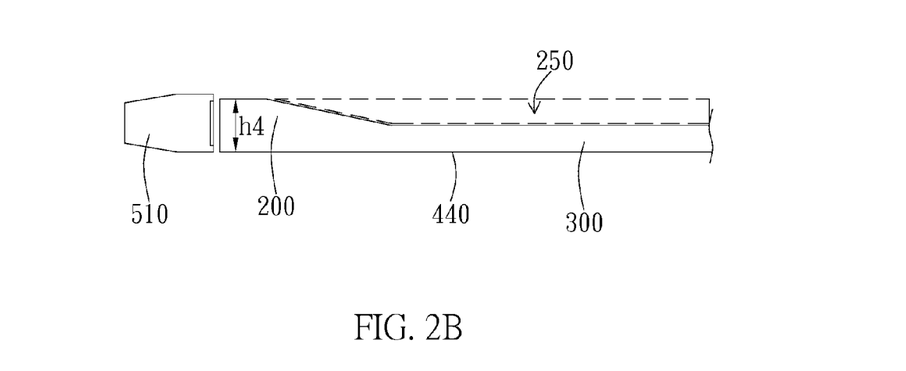
FIG. 2B is a side view of the embodiment shown in FIG. 2A.

In view of the above-mentioned, in the preferred embodiment of the present disclosure, the wedge portion 200 of the light guide plate 100 has the greatest height (the greatest thickness) "h4" in the normal direction of the light-exiting surface 420. The light-exiting surface 420 and the light-guiding inclined plane 430 leave away from a position having that height and move toward the bottom surface 440. Accordingly, a space between the position having that height and the light-exiting surface 420 and the light-guiding inclined plane 430 is defined as a sunken space (or namely accommodated space) 250, as FIG. 2B shows.

Figure 3:
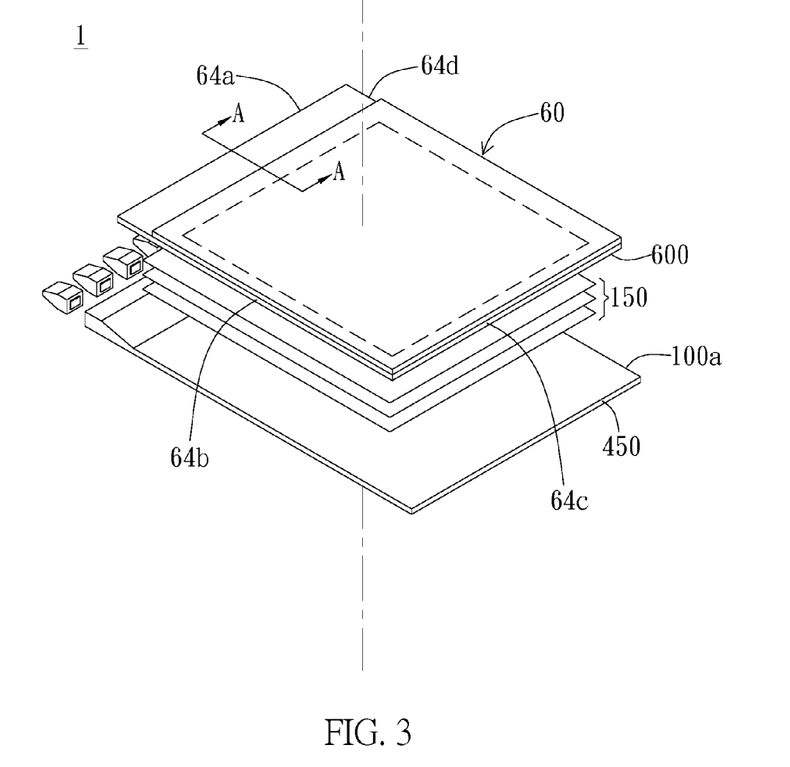
FIG. 3 is an exploded view of the embodiment of the display module of the present disclosure.
Figure 4:
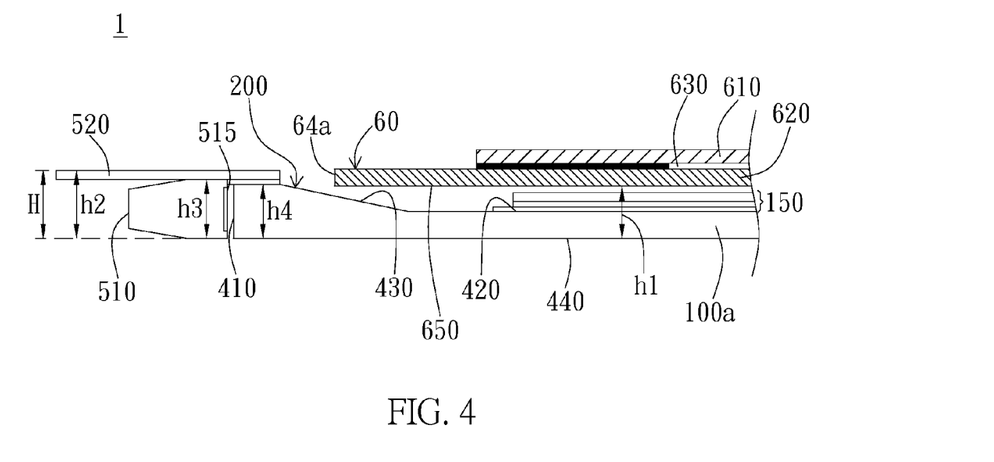
FIG. 4 is a cross-sectional view of the embodiment shown in FIG. 3 along the A-A line.
Figure 5:
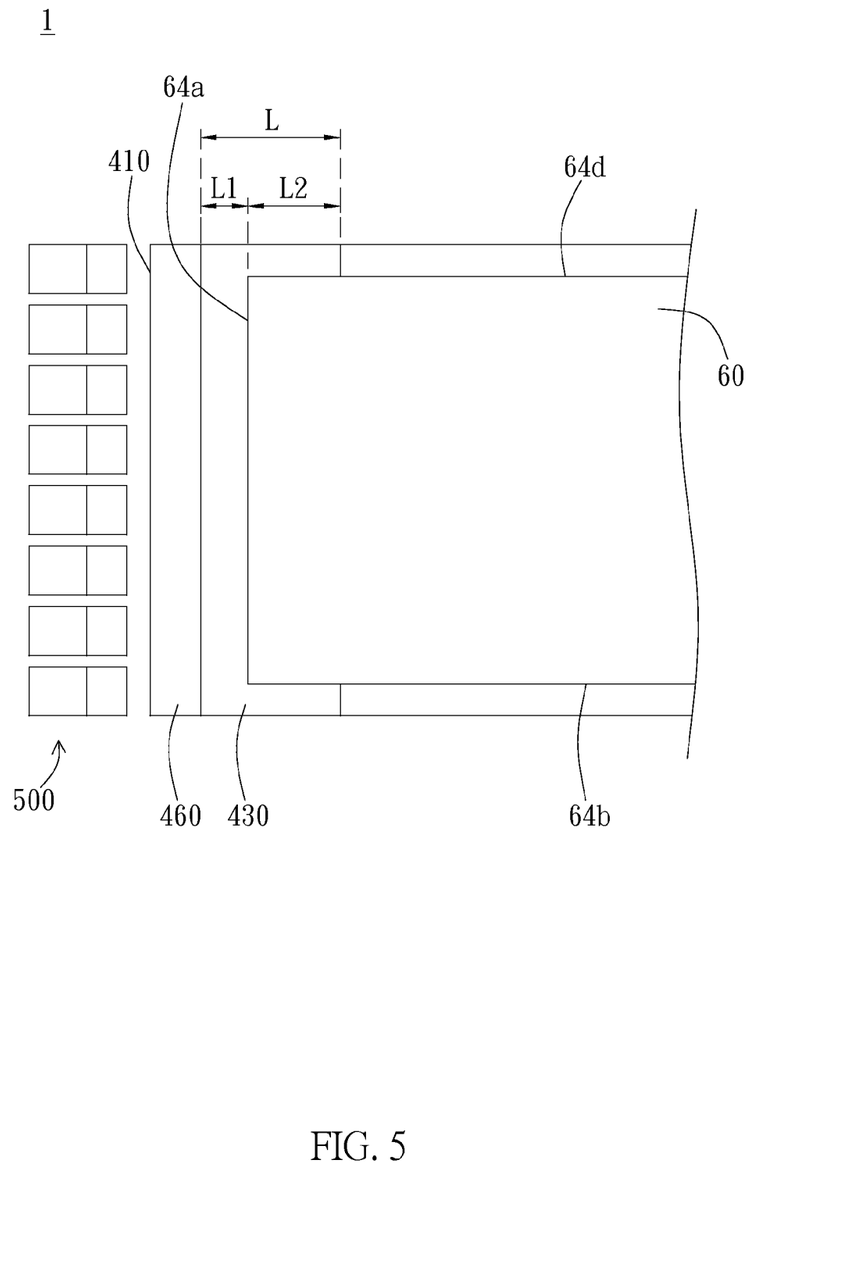
FIG. 5 is a top view of the embodiment shown in FIG. 3.

The display module of the present disclosure, as shown in FIGS. 3, 4 and 5, includes a display panel 60 and preferably includes the backlight module 10 as shown in FIG. 1 or 2A. As FIG. 3 shows, the display panel 60 is disposed on the light guide plate 100a. The display module 1 may further include an optical film 150 disposed between the display panel 60 and the light guide plate 100a. The optical film 150 includes at least one of the films such as a diffusing film, a polarizing film, a prism film, a brightness enhancement film, a dual brightness enhancement film, an optical compensation film or other applicable optical films, or films having at least two functions of the above-mentioned optical films. The light guide plate may be as the light guide plate 100 shown in FIG. 1 or the light guide plate 100a shown in FIG. 2A. The display module of the embodiment using the light guide plate 100a of FIG. 2A will be interpreted, but not limited thereto. Specifically, the display panel 60 includes tiered a first substrate 610 and a second substrate 620, and a display medium layer 630 disposed between the first substrate 610 and the second substrate 620. Material(s) of the display medium layer 630 includes liquid crystal material, electrophoresis material, electrowetting material, electrochromic material, material capable of being excited by electromagnetic wave, etc. In the preferred embodiment of the present disclosure, the display medium layer 630 exemplarily has liquid crystal; meanwhile, the display panel 60 is a liquid crystal display panel; the first substrate 610 and the second substrate 620 have color filter layer and Thin-Film Transistor (TFT) array disposed thereon, respectively. However, an inner surface of the first substrate 610 or an inner surface of the second substrate 620 may have both color filter layer and TFT array disposed thereon while the other one (i.e. the inner surface of the second substrate 620 or the inner surface of the first substrate 610) optionally does or does not have another TFT array disposed thereon. In addition, sides 64a, 64b, 64c and 64d of the display panel 60 are usually composed of a lateral surface of the first substrate 610 and/or a lateral surface of the second substrate 620.

Further, the display panel 60 of the present disclosure generally has a rectangular outline, but not limited thereto, for example, polygon shape. The display panel 60 is disposed on the light guide plate 100a and substantially parallel thereto; a bottom surface 600 of the display panel 60 faces the light-exiting surface 420; the sides of the display panel 60 correspond to sides of the light guide plate 100a, respectively. Preferably, the display panel 60 is disposed on the light guide plate 100a in the way that a vertical projection of the side 64a of the display panel 60 falls on (or namely disposed in) the light-guiding inclined plane 430 of the light guide plate 100a. The side 64a corresponds to the side of the light guide plate 100a having the light-entering surface 410 and corresponds to the light source module 500. In other words, when the display panel 60 is disposed on the light guide plate 100a and parallel thereto, the side of the display panel 60, such as the side 64a composed of the lateral surface of the first substrate 610 and/or the lateral surface of the second substrate 620, has the vertical projection on the light-guiding inclined plate 430, wherein the side 64a is on the same side of the light guide plate 100a having the light-entering surface 410. Specifically, the side of the display panel 60 by the light source module 500, such as the side 64a composed of the lateral surface of the first substrate 610 and/or the lateral surface of the second substrate 620, merely has the vertical projection falling on the light-guiding inclined plane 430 or on the plate portion 300 rather than falling on the top surface 460 and/or the light source module 500. Further speaking, as FIGS. 4 and 5 show, a vertical projections of an edge of the side of the display panel 60 closest to the light source module 500 is located on the light guide plate 100a and does not go beyond the light-guiding inclined plane (light-guiding inclined surface) 430. Further, as shown in FIG. 5, a distance between the projection of the side 64a of the display panel 60 and one side of the light-guiding inclined plane 430 is "L1"; a distance between the projection of the side 64a and the opposite side (or namely other side) of the light-guiding inclined plane 430 is "L2", wherein a sum of "L1" and "L2" is substantially equal to a length "L" of a vertical projection of the light-guiding inclined plane 430 on a plane.

On the other hand, a distance between the display panel and the light guide plate is smaller in the present disclosure. Accordingly, a thickness of the display module may be smaller because of the smaller distance between the display panel and the light guide plate. As shown in the embodiment of FIG. 4, in the display module of the present disclosure, an altitude (a height) of the bottom surface 600 of the display panel 60 on the light guide plate 100a in the normal direction of the light-exiting surface 420, i.e. "h1", is lower (smaller) than an altitude (a height) of a top of the light source module 500 in the normal direction of the light-exiting surface 420, i.e. "H" (i.e. a thickness of the light source module 500). A reference plane of the altitudes is preferably the bottom surface 440. Specifically, the display panel 60 is disposed on the light guide plate 100a in a manner that the second substrate 620 faces the light guide plate 100a and a bottom surface 650 of the second substrate 620 (i.e. an outer surface of the second substrate 620) serves as a surface and is above the light guide plate 100a. The bottom surface 650 of the second substrate 620 substantially serves as the bottom surface 600 of the display panel 60; meanwhile, an altitude (a height) of the bottom surface 650 of the second substrate 620 with respect to the bottom surface 440 in the normal direction of the light-exiting surface 420 is "h1". Further, one end (e.g. an upper end) of the height "h1" is the bottom surface 650 of the second substrate 620 and the bottom surface 650 has no optical film attached thereon; the other end (e.g. a lower end) of the height "h1" is the bottom surface 440 of the light guide plate 100a. If the bottom surface 650 has optical film such as 150 attached thereon, the height "h1" is still measured from the bottom surface 650 (i.e. at the upper end) to the bottom surface 440 of the light guide plate 100a (i.e. at the lower end). The height of the top of the light source module 500 depends on an arrangement of the interior components such as the light guide plate 100a or the light source 510 in the normal direction, wherein the altitude (the height, "h1") of the bottom surface 650 of the second substrate 620 of the display panel 60 of the present disclosure is preferably lower than the altitude (the height) of the top of the wedge portion 200 (measured at the thickest portion) and/or an altitude of a top of the light source 510. The height of the top (measured at the thickest portion) or the top surface 460 of the wedge portion 200 of the light guide plate 100a in the normal direction of the light-exiting surface 420 is "h4". The light source 510 includes light-emitting diode (not shown) and selectively has a package (not shown) enclosing the light-emitting diode. Accordingly, the top of the light source 510 is specifically a top of the package; a height of the top of the package (not shown) in the normal direction of the light-exiting surface 420 is "h3" based on the bottom surface 440. In other embodiments, the light source 510 may include such as a light source stand (not shown), wherein the top of the light source is equal to a top of the light source holder (not shown, or namely light source stand); a height of the top of the light source holder (now shown) in the normal direction of the light-exiting surface 420 is "h3" based on the bottom surface 440.

In the embodiments of the present disclosure, the light source module 500 preferably includes the circuit board 520. As FIG. 4 shows, the light source 510 is disposed on the circuit board 520. The light source module 500 is so disposed that the circuit board 520 is disposed on the top surface 460 of the light guide plate 100a or on the highest portion of the light-guiding inclined plane 430 of the light guide plate 100a (i.e. where the light guide plate has the largest thickness; in the embodiment the height is "h4"), wherein the light source 510 is disposed adjacent to the light-entering surface 410 of the light guide plate 100a. In the embodiment, the altitude (the height "h1") of the bottom surface 650 of the second substrate 620 of the display panel 60 is preferably lower than an altitude (a height "h2") of a top of the circuit board 520 (in the embodiment, "h2" is equal to the height of the light source module "H"), wherein a bottom of the circuit board 510 faces the top of the package; the height of the top of the circuit board 520 in the normal direction of the light-exiting surface 420, based on the bottom surface 440, is "h2". The altitude (the height "h1") of the display panel 60 may be lower (smaller) than the altitude (the height "h3") of the light source 510 or lower than the greatest height ("h4") of the light guide plate. A reference plane of the above-mentioned altitudes/heights is preferably the plane where the bottom surface 440 of the light guide plate 100a lies.

As mentioned above, the altitude (the height "h1") of the bottom surface 650 of the second substrate 620 of the display panel 60 is substantially lower (smaller) than the altitude (the height "h2") of the top of the circuit board 520, lower than the highest position of the wedge portion 200 of the light guide plate (where the light guide plate has the largest thickness; in the embodiment the height is "h4") and/or the altitude (the height) of the top of the light source 510 (in the embodiment the height is "h3"). Accordingly, the surface of the display panel 60, i.e. the bottom surface 650 of the second substrate 620, may be located lower than a surface of, i.e. the bottom surface 650 of the second substrate 620 in the conventional display panel. Accordingly, the display panel 60 may be closer to the light guide plate 100a and has at least a portion entering the sunken space 250 that is adjacent to the light-exiting surface 420 and the light-guiding inclined plane 430. The sunken space 250 resulted from the wedge portion 200 is therefore well used; a portion of the display panel 60 is accommodated in the sunken space 250 so that a thickness measured from a display surface of the display panel 60 to the bottom surface 440 of the light guide plate 100a is decreased and the entire module will have a smaller thickness.

Figure 6:
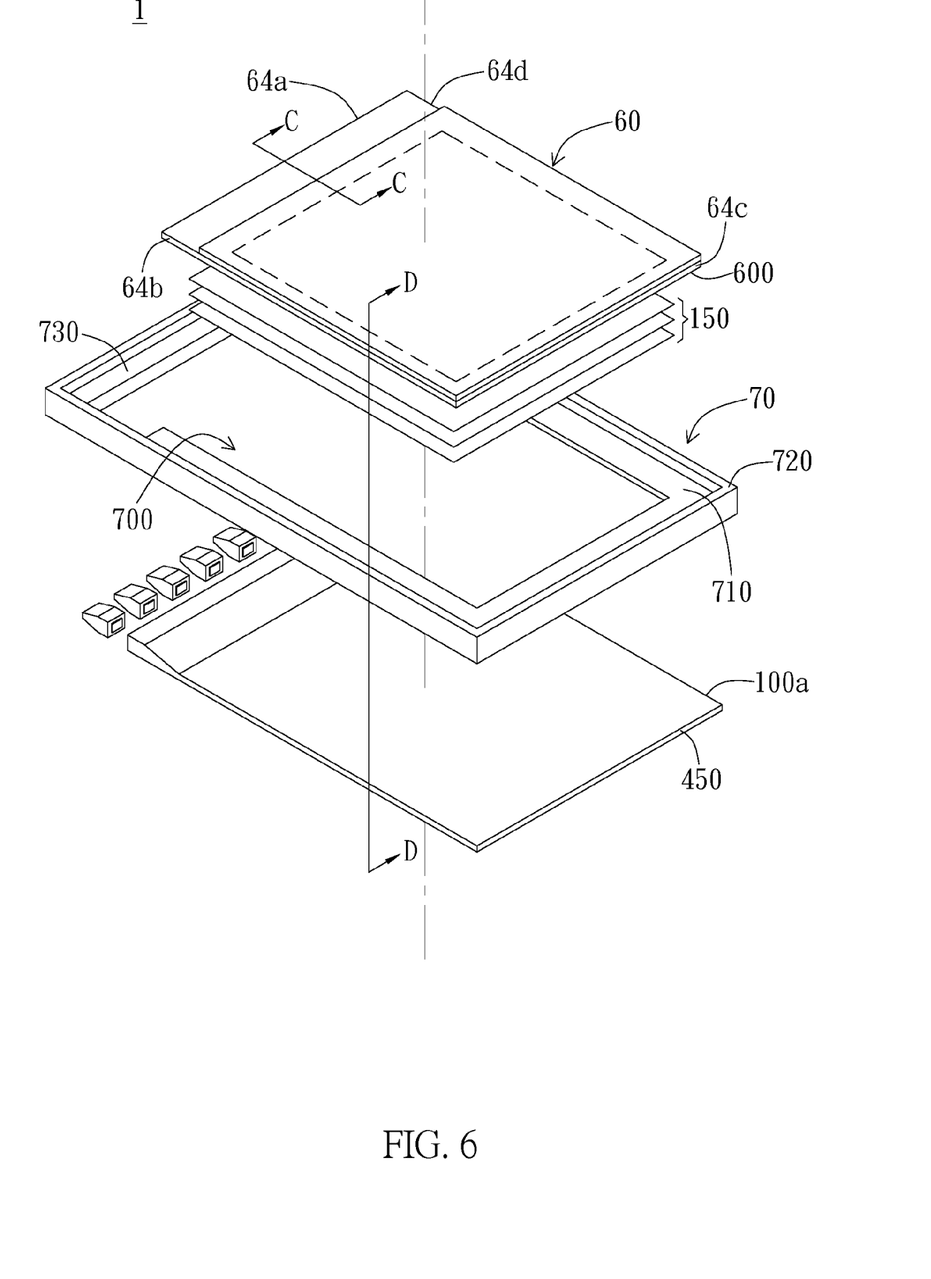
FIG. 6 is an exploded view of another embodiment of the display module of the present disclosure.
Figure 7A:
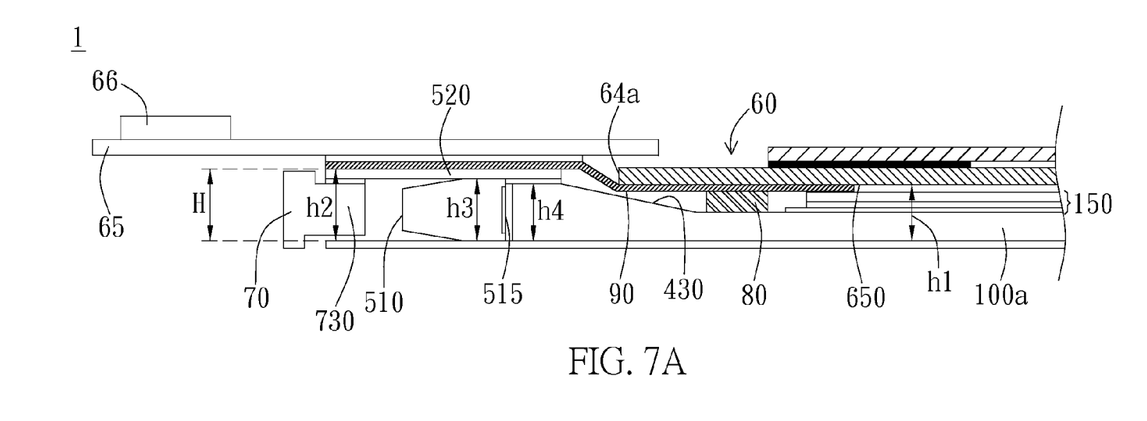
FIG. 7A is a cross-sectional view of the embodiment shown in FIG. 6 along the C-C line.
Figure 7B:
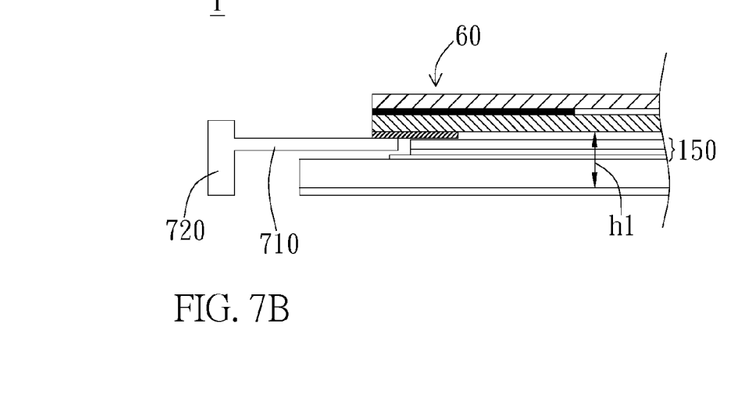
FIG. 7B is a cross-sectional view of the embodiment shown in FIG. 6 along the D-D line

In the embodiment shown in FIGS. 6 and 7A-7B, the display module of the present disclosure further includes a frame 70, which supports the display panel 60 to be on the light guide plate 100a. Specifically, the frame 70 preferably includes a body 720 and a platform (or namely supporting portion) 710, wherein it is preferably that the platform 710 supports the display panel 60; the platform 710 is disposed on the inner side of the body 720. Preferably, the platform 710 is perpendicular to the inner side of the body 720, but not limited thereto. The platform 710 may define a plane and supports the display panel 60 on the plane; the plane is substantially parallel to the light guide plate 100a. In the embodiment shown in FIGS. 6 and 7A-7B, the body 720 provides an accommodation space 700. The inner surface of the body 720 faces the accommodation space 700; the platform 710 extends toward the accommodation space 700 from the body 720. However, the platform is not necessarily provided by a frame.

The platform 710 in the display module preferably has an altitude (a height) higher than that of the plate portion 300 of the light guide plate 100a and supports the display panel 60 to be located at the above mentioned altitude, i.e. to let the altitude (the height "h1") of the bottom surface 600 of the display panel 60 be lower (smaller) than the altitude (the height "H") of the top of the light source module 500, or lower (smaller) than the altitude (the height "h2") of the circuit board 520, or lower (smaller) than the altitude (the height "h3") of the light source 510 or smaller than the greatest height "h4" of the light guide plate 100a. On the other hand, the platform 710 is located at the side of the light guide plate 100a not next to the light source module 500, i.e. the platform 710 is located at the side of the light guide plate 100a having no the light-entering surface 410, e.g. located at the side of the lateral surface 450. In other words, the platform 710 is not located at and is not face to the light-entering surface 410 of the light guide plate 100a. In addition, in the embodiment shown in FIG. 6, the platform 710 is preferably continuous and formed on three adjacent inner surfaces of the body 720 and located between the display panel 60 and the plate portion 300 of the light guide plate 100a. In other words, the platform 710 supports edges of the sides 64b-64d of the display panel 60 above the plate portion 300, as FIG. 7B shows. On the other hand, as the preferred embodiment shown in FIG. 7A, it is not necessary that the platform 710 extends between the display panel 60 and the wedge portion 200 of the light guide plate 100a. In other words, it is not necessary that the platform 710 supports an edge of the side 64a of the display panel 60. Accordingly, the frame 70 may not have a vertical projection falling on the side of the display panel 60 corresponding to the light source module 500. In other embodiments of the present disclosure, the platform 710 may be discontinuous (e.g. a plurality of platforms) and formed on the inner side of the body 720. Meanwhile, the body 720 may include discontinuous sections and not a unity.

The light source module 500 and the light guide plate 100a of the backlight module 10 are preferably accommodated in the accommodation space 700 of the frame 70. In the preferred embodiment of the present disclosure, the light source module 500 of the backlight module 10 is disposed at the side of the light guide plate 100a having the light-entering surface 410; the frame 70 surrounds the backlight module 10 along the lateral surface 450 of the light guide plate 100a and passes the side of the light source module 500 opposite to the light guide plate 100a. As FIG. 7A shows, it is not necessary that a portion of the frame 70, which passes the light source module 500, has the platform 710 formed on the inner side of the body 720 and extends between the display panel 60 and the light guide plate 100a.

In the preferred embodiment of the present disclosure, as FIGS. 6 and 7A-7B show, the frame 70 may further include a supporting portion 730 disposed on the inner side of the body 720. Preferably, the supporting portion 730 is located on the inner side of the body 720 at the portion of the frame 70 that passes the light source module 500 and corresponds to the light source module 500, wherein the circuit board 520 of the light source module 500 may extend toward the frame 70 and reach the supporting portion 730. On the other hand, the supporting portion 730 may support the circuit board 520 of the light source module 500 and provide a connection or positioning between the frame 70 and the backlight module 10. Furthermore, the supporting portion 730 on one side of the light source module 500 has neither a vertical projection falling on the light source 510 nor a vertical projection falling on the light guide plate 100a, such as the wedge portion 200 of the light guide plate 100a.

In the preferred embodiment, the display module 1 further includes a supporting component 80 disposed on the light-exiting surface 420 of the light guide plate 100a, as shown in FIGS. 7A-7B. The supporting component 80 is preferably adjacent to a joint (or namely connection place) of the light-exiting surface 420 and the light-guiding inclined plane 430 and may support a portion of the bottom surface 650 of the display panel 60 that is close to the side 64a. Material and color of the supporting component 80 are not limited; however, the supporting component 80 may further have light-absorbing property or light-shielding property. Further, optical performance of the display module 1 may be adjusted by the supporting component 80, which has the selected material, character or color. In other embodiments, the supporting component and the light guide plate may be in an integral from, wherein the supporting component is integrally formed on the light-exiting surface.

In the embodiment of the present disclosure, the display module 1 may include a light shielding tape 90 disposed at the side of the backlight module 10 close to the light source module 500 and shields the light exiting from the light source module 500. Specifically, as shown in FIGS. 7A-7B, one end of the light shielding tape 90 preferably extends to a portion of the bottom surface 650 of the second substrate 620, i.e. passing the side 64a, covering the bottom surface 650 of the second substrate 620 and being attached thereon. The light shielding tape 90 may further extend and pass the light-guiding inclined plane 430 of the light guide plate 100a. In addition, the other end of the light shielding tape 90 may extend toward the light source 510, pass the illumination side 515 and preferably lay over the light source module 500. In other embodiments, the one end of the light shielding tape 90 preferably merely extends to the wedge portion 200 of the light guide plate 100a while the other end may extend toward the light source 510 and pass the illumination side 515, and preferably lay over the light source module 500.

Figure 8A:
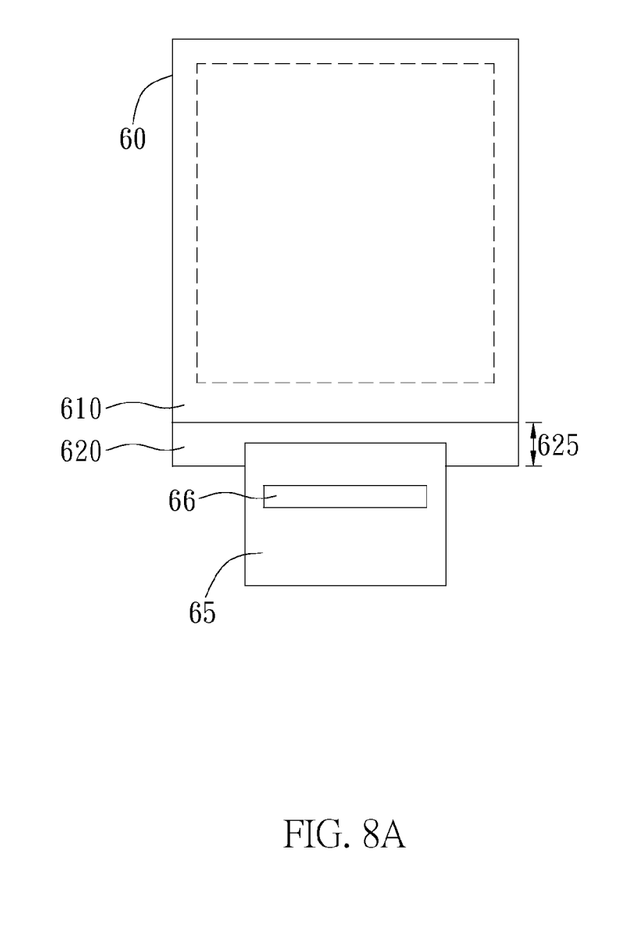
FIG. 8A is a top view of the embodiment shown in FIG. 6.
Figure 8B:
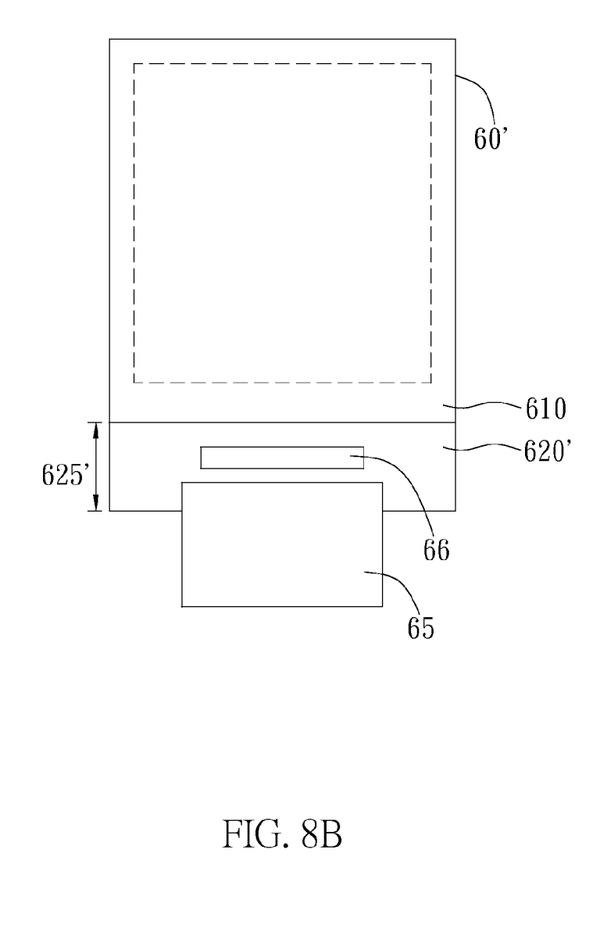
FIG. 8B is a top view of another embodiment of the present disclosure.

In the embodiments of the present disclosure, the display module 1 further includes an adaptor circuit board 65 and a drive chip 66. In the embodiments shown in FIGS. 7A-7B and 8A, the adaptor circuit board 65 is electrically connected to the display panel 60, preferably located in the display module 1 on the side having the light source module 500 and disposed on the light source module 500. The drive chip 66 is disposed on the adaptor circuit board 65 and is connected with a conductive wire (or namely conductive line, transmitted line) in the display module 1. Specifically, the adaptor circuit board 65 is preferably a flexible circuit board and is connected to the second substrate 620. The drive chip 66 is disposed on the adaptor circuit board 65 (or namely Chip on Film (COF)) and electrically connected with a conductive wire of the second substrate 620. By COF, the adaptor circuit board 65 extends from the side 64a of the display panel 60 to pass the wedge portion 200 and the light source module 500 while the drive chip 66 is disposed on an outer side of the adaptor circuit board 65 with respect to the side 64a and the light source module 500, wherein the vertical projection of the side 64a of the display panel 60 only falls on the light-guiding inclined plane 430 or the plate portion 300 of the light guide plate 100a. In this case, the display panel 60, especially the second substrate 620 thereof, may have a smaller area. Specifically, the second substrate 620 of the display panel 60 may have a smaller Outer Lead Bonding (OLB) area 625. However, in other embodiments, the drive chip 66 may be disposed on an inner surface of the second substrate 620' of the display panel 60' (or namely Chip on Glass (COG)). Alternatively, a circuit of the drive chip 66 may be integrated into the inner surface of the second substrate 620' of the display panel 60'. If so, the second substrate 620' of the display panel 60' may have a greater Outer Lead Bonding (OLB) area 625', as shown in FIG. 8B.

A reference plane of the above-mentioned altitudes/heights ("H", "h1", "h2", "h3" and "h4") is preferably the plane where a bottom of the backlight module 10 and/or the display module such as the bottom surface 440 of the light guide plate 100a lies, but not limited thereto. When the backlight module 10 and/or the display module 1 is upside down, the reference plane may be a plane where a top of the backlight module 10 and/or the display module lies.

Although the preferred embodiments of present disclosure have been described herein, the above description is merely illustrative. The preferred embodiments disclosed will not limited the scope of the present disclosure. Further modification of the disclosure herein disclosed will occur to those skilled in the respective arts and all such modifications are deemed to be within the scope of the disclosure as defined by the appended claims.

What is claimed is:

1. A display module, including:
   a backlight module, comprising:
   a light guide plate having a light incident surface, a light-exiting surface, a light-guiding inclined surface, a bottom surface and a lateral surface, wherein the light-guiding inclined surface is connected to the light incident surface and the light-exiting surface, the bottom surface is connected to the light incident surface and the lateral surface, the lateral surface is connected to the light-exiting surface and the bottom surface, the light incident surface, the light-guiding inclined surface and a portion of the bottom surface constitute a wedge portion while the light-exiting surface, the lateral surface and another portion of the bottom surface constitute a plate portion; and
   a light source module disposed at the light incident surface and emitting light into the wedge portion; and
   a display panel disposed on the light guide plate, wherein the display panel includes a first substrate, a second substrate and a display medium layer disposed between the first substrate and the second substrate, the display panel has a side comprising lateral surfaces of the first substrate and the second substrate at a same position, wherein the side of the display panel is near the light incident surface of the light guide plate, and vertical projections of an edge of the first substrate and an edge of the second substrates of the display panel on the light guide plate are both located in the light-guiding inclined surface or in the plate portion.

2. The display module of claim 1, wherein the second substrate of the display panel on a same side of the light source module has a bottom surface, a height of the bottom surface in a normal direction of the light-exiting surface is lower than a height of a top of the light source module.

3. The display module of claim 2, wherein the light source module includes a circuit board and a plurality of light sources disposed on the circuit board, the circuit board is disposed above the light incident surface, and the height of the bottom surface in the normal direction of the light-exiting surface is lower than a height of the circuit board.

4. The display module of claim 2, wherein the light source module includes a plurality of light sources, the height of the bottom surface in the normal direction of the light-exiting surface is lower than a height of the light sources.

5. The display module of claim 1, wherein a top of the wedge portion and a top of the light-exiting surface in the normal direction of the light-exiting surface define an accommodated space, and at least a portion of the display panel is accommodated in the accommodated space.

6. The display module of claim 1, further including a frame, the frame at least partially supports an edge of the display panel, wherein a projection of the frame on the display panel is outside the side of the display panel corresponding to the light source module.

7. The display module of claim 6, wherein a portion of the frame is located on one side of the light source module rather than between the light guide plate and the display panel.

8. The display module of claim 1, further including a supporting component disposed on the light-exiting surface and adjacent to a connection of the light-exiting surface and the light-guiding inclined surface, wherein the supporting component supports a bottom of the display panel.

9. The display module of claim 8, wherein the supporting component has light-absorbing property or light-shielding property.

10. The display module of claim 1, further including an adapter circuit board, wherein the adapter circuit board is disposed above the light source module and has one end electrically connected to one side of the display panel corresponding to the light source module.

11. The display module of claim 1, further including a light shielding tape, wherein one end of the light shielding tape is adhered to a bottom of the display panel and a projection of the light shielding tape on the light guide plate covers the light-guiding inclined surface.

12. The display module of claim 11, wherein the other end of the light shielding tape lays over the light source module.

13. The display module of claim 1, wherein a vertical projections of an edge of the side of the display panel is located on the light guide plate and does not go beyond the light-guiding inclined surface.

14. The display module of claim 1, wherein an end of the light-guiding inclined surface connected to the light incident surface is substantially parallel to an end of the light-guiding inclined surface connected to the light-exiting surface.

* * * * *